2,779,748
Patented Jan. 29, 1957

2,779,748

THERMOPLASTIC COMPOSITION COMPRISING VINYL CHLORIDE POLYMER AND DIOLEFIN-DIALKYL FUMARATE COPOLYMER

Robert H. Snyder, Newark, N. J., assignor to United States Rubber Company, New York, N. Y., a corporation of New Jersey No Drawing. Application May 4, 1953,
Serial No. 352,990

7 Claims. (Cl. 260—45.5)

This invention relates to improved thermoplastic compositions which are rigid and yet have a high impact strength, and more particularly it relates to thermoplastic compositions comprising blends of unplasticized vinyl chloride polymers with relatively small amounts of a copolymer of a conjugated diolefin and a dialkyl fumarate.

The ordinary polyvinyl chloride of commerce is a hard, rigid, chemically resistant thermoplastic polymer which has come into widespread use in a large variety of applications because of its desirable combination of physical properties. However, the material has one major disadvantage, namely, relatively poor impact resistance, which precludes its successful use in fabricating rigid articles that must withstand blows in normal usage. When polyvinyl chloride is compounded with relatively large amounts of soluble plasticizers (e. g., 50-100 parts of plasticizer per 100 parts of polyvinyl chloride) the resulting products are flexible, soft materials suitable for forming films and the like, but the making of hard, rigid articles therefrom is entirely precluded.

One object of the present invention is to compound polyvinyl chloride in such a way as to retain its rigidity, hardness and flexural strength and to raise its impact strength significantly.

Another object of the invention is to produce improved polyvinyl chloride compositions capable of being fabricated into non-brittle, tough, rigid articles, which substantially retain the excellent chemical resistance and resistance to heat distortion that are characteristic of the polyvinyl chloride itself.

According to the invention, a major amount of an unplasticized vinyl chloride polymer is compounded with a minor amount of a rubbery copolymer of a conjugated diolefin with a fumarate ester and the mixture is fusion-blended. This combination of materials has most unexpectedly been found to result in a spectacular improvement in the impact strength. Furthermore, in these mixtures the unexpected improvement in impact strength is obtainable without reducing the rigidity significantly. The invention therefore provides improved vinyl chloride polymer compositions which are rigid but non-brittle, and are therefore adapted to formation of rigid sheets or films, or other articles capable of rendering excellent service, even in applications where polyvinyl chloride has heretofore been considered totally unsuited.

The vinyl chloride polymer used in the invention may be either polyvinyl chloride itself, or a copolymer of vinyl chloride with another copolymerizable monomer, the latter usually being a monoethylenically unsaturated material, such as vinyl acetate or vinylidene chloride. These polymeric materials will be designated generally as vinyl chloride polymers.

The rubbery copolymer component of the mixtures of this invention is defined as a copolymer of a conjugated diolefin with a fumarate diester of an aliphatic alcohol. The conjugated diolefin is usually butadiene, but it can be one of the homologs thereof, of which isoprene and piperylene are the most important.

The fumarate ester has the structure

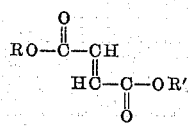

wherein R and R' are alkyl groups which can be alike or different. Preferably, R and R' are lower alkyl groups, i. e., alkyl groups containing not over eight carbon atoms each.

The relative proportions of combined monomers in the elastomer copolymers can vary widely; e. g., usually from about 15 to 85% of a diolefin is copolymerized correspondingly with from about 85 to 15% of a fumarate ester.

The compositions of the invention contain, in 100 parts of the blend, from about 3 parts to 24 parts by weight of the fumarate copolymer, and correspondingly from about 97 parts to 76 parts of the vinyl chloride polymer. Compositions containing less than 3 parts of the fumarate copolymer do not show a satisfactory improvement in impact strength. On the other hand, it is found that compositions containing 25 parts or more of the fumarate copolymer have very low tensile strength, low rigidity, and low tear resistance, as well as a very poor physical appearance characterized by excessive lumpiness, and are of no value in making rigid articles of high impact strength. The preferred compositions contain from about 5 parts to about 20 parts of the fumarate copolymer in 100 parts of the blend of copolymer and vinyl chloride polymer.

However, these broader composition limits must be understood to be the maximum and minimum within which all of the compositions of my invention fall. Some of the fumarate copolymers can be used throughout the given range, whereas some others, made from a different fumarate monomer or even from the same monomer but in a different proportion of monomer, to diolefin, can best be used over only a limited portion of the given range. The exact optimum proportions can be determined in any specific case by simple preliminary experiment. In general, it can be said that the compositions of my invention have an impact strength of at least twice that of the vinyl chloride polymer from which they were made, and a flexural modulus of at least 100,000 p. s. i., as discussed in more detail hereinafter.

The compositions can be molded, calendered, extruded, or otherwise fabricated into articles of the desired shape, by the machinery and methods conventionally used in making plastic articles. They are most useful in fabricating articles which need high impact strength in combination with rigidity, e. g., rigid sheets, rods, and many other molded or extruded articles. The new compositions are especially useful in making rigid pipe which is much lighter in weight than metal pipe.

The compositions of the invention are prepared by intimately mixing the vinyl chloride polymer and the fumarate elastomer together. Usually, the two materials are mixed together in the solid form by means of a mixing machine of the type normally used for mixing rubber or plastics, e. g., a roll mill or a Banbury mixer. It is also possible to mix the two ingredients in dispersed form, that is, the latices of the vinyl chloride polymer and the elastomer may be mixed together and then coagulated to yield the desired blend. If desired, one of the materials in solid form, e. g., polyvinyl chloride powder, may be dispersed in a latex of the other material, the mixture thereafter being dried. The compositions may be modified by the addition of optional ingredients, such as fillers, dyes, pigments, stabilizers, etc. However, regardless of the method of mixing the two materials, it is necessary to heat the mixture at some stage to a temperature above that at which the vinyl chloride polymer fuses, in order to obtain an adequately intimate combination of the materials. Temperatures within the range of about 250°–300° F. are generally adequate for this purpose. Without such heating the vinyl chloride polymer will exist as discrete particles in the mixture, and the desired physical properties will not be obtained. This heating is conveniently done either during mixing on the mill or in the Banbury, or during the final molding. A stabilizer is preferably added to the mixture before heating, in order to minimize the splitting off of hydrogen chloride, and to neutralize any hydrogen chloride which does evolve. Hydrous tribasic lead sulfate, a typical stabilizer for polyvinyl chloride, is an example of a suitable stabilizer.

The toughening effect of the fumarate elastomer used in my vinyl chloride polymer compositions differs radically from the softening or plasticizing effect of conventional "plasticizers" in that adequate rigidity of the compositions is retained and the impact strength is greatly increased, whereas plasticizers markedly reduce the rigidity and do not impart high impact strength. Thus, in a typical embodiment of the invention, the impact strength can be raised from a value for the vinyl chloride polymer itself of about 0.8 foot-pound per inch of notch (Izod) to a value for the blend of from about 2 up to about 30 foot-pounds without reducing the rigidity below practical limits. The latter is the most spectacular improvement in impact strength of vinyl chloride polymers known to me.

It is interesting to note that butadiene homopolymer does not raise the impact strength of vinyl chloride polymers significantly. Consequently, it is most surprising to find that the diolefin-fumarate copolymers improve the impact strength to such an extraordinary extent. The copolymer improves the impact strength of polyvinyl chloride even though it is present in such a small amount as not to decrease the rigidity of the composition markedly.

The rigidity or flexibility is generally expressed in terms of the flexural modulus. Polyvinyl chloride itself has a flexural modulus at 25° C. of about 400,000 pounds per square inch. In general, it may be stated that materials having a flexural modulus above 100,000 p. s. i. are sufficiently stiff to be employed in the usual applications requiring a rigid material. However, it is preferred to use materials having a flexural modulus of at least 150,000 p. s. i. in fabricating rigid articles. The preferred compositions of the invention are therefore those having a flexural modulus of at least 150,000 p. s. i. The values recorded in the examples herein are the actual measured values multiplied $10^{-3}$. These compositions also have an impact strength of at least twice that of the vinyl chloride polymer itself, and usually very much higher.

The polyvinyl chloride used in the invention is typified by the commercially available resins known as the Marvinols, e. g., Marvinol VR–10 and Marvinol VR–20. Marvinol VR–10 is used where high heat stability is desired during processing, as in slush molding or in the extrusion of pipe. Its specific viscosity (0.4 g. of the Marvinol in 100 cc. of nitrobenzene) at 30° C. is 0.55. Marvinol VR–20 is a general purpose resin used in coated fabrics, unsupported film, electrical insulation, etc. Its specific viscosity, measured in the same way, is 0.38. Other polyvinyl chloride resins which are operable in my invention are exemplified by the commercially available materials marketed under such trade names as Geon 121, Geon 101, Geon 101–EP and Vinylite QYNA. The vinyl chloride:vinyl acetate copolymers used are exemplified by commercially available resins known as the Vinylites, especially those ranging in composition from about 85% to 96% of vinyl chloride and correspondingly from about 15% to 4% of vinyl acetate. Certain of the Vinylites, e. g., VAGH and VMCH, which have a ratio of vinyl chloride to vinyl acetate falling within these preferred limits, also contain, according to the manufacturer, small amounts of other materials. These Vinylites are operable in our invention, and our use of the term "vinyl chloride:vinyl acetate copolymers" is understood to include them. The vinyl chloride:vinylidene chloride copolymers used contain from 1% up to 99% of vinylidene chloride. They are typified by the commercial materials sold under the trade name Saran.

The following examples illustrate my invention in more detail. All compositions are given in parts by weight. All of the fumarate:diolefin copolymers were made by emulsion copolymerization in accordance with conventional practice. The proportions of the monomers are given in the form of feed ratios.

*Example 1*

The following stocks were made by stirring Marvinol powder with diethyl fumarate:butadiene copolymer latices in the proportions shown below, drying the mixtures, fusing them on a mill for 5 minutes at 300–310° F., i. e., above the fusion temperature of the Marvinol, and molding into flat slabs at 338° F. for 10 minutes under pressure. Stock A, which is shown for contrast with the stocks (B–G) exemplifying my invention, was milled and molded in like manner.

| Stock | A | B | C | D | E | F | G |
|---|---|---|---|---|---|---|---|
| Marvinol VR–10 a | 100 | 90 | 95 | 90 | 95 | 90 | 85 |
| Diethyl fumarate:butadiene copolymer as latex: | | | | | | | |
| 76:24 | | b 10 | | | | | |
| 61:39 | | | b 5 | b 10 | | | |
| 40:60 | | | | | b 5 | b 10 | b 15 |
| Izod impact strength (ft.-lbs./in. of notch) | 0.8 | 23.0 | 2.6 | 20.8 | 15.0 | 18.3 | 11.3 |
| Flexural modulus at 25° C. (thousands of p. s. i.) | 440 | 309 | 362 | 307 | 382 | 328 | 261 | a Polyvinylchloride
b Solid content.

This example shows that the inclusion of each of these diethyl fumarate:butadiene copolymers in the compositions effects a spectacular improvement in their impact strength over that of Marvinol, while their rigidity is still satisfactorily high.

In like manner the blending of these diethyl fumarate:- butadiene copolymers separately with copolymers of vinyl chloride and vinyl acetate (Vinylites) or with copolymers of vinyl chloride and vinylidene chloride (Saran) effects similar improvements in impact strength of the blends over that of the respective vinyl chloride copolymers alone.

*Example 2*

The following stocks were made by blending coagulated diethyl fumarate:butadiene copolymers with Marvinol on the mill at 300–310° F., followed by molding as in Example 1.

| Stock | H | I | J |
|---|---|---|---|
| Marvinol VR–10 | 85 | 90 | 85 |
| Diethyl fumarate:butadiene copolymer: | | | |
| 76:24 | 15 | | |
| 61:39 | | 10 | 15 |
| Izod impact strength | 27.6 | 3.3 | 2.5 |
| Flexural modulus at 25° C.×$10^{-3}$ | 219 | 289 | 145 |

This example shows that the materials can be blended in solid form without departing from my invention.

Similarly, the blending of Marvinol VR–10 with comparable copolymers of butadiene with dimethyl fumarate or with dibutyl fumarate effects a considerable improvement in the impact strength of the blends over that of Marvinol VR–10 alone.

Example 3

The following stocks were made by blending Marvinol with a diethyl fumarate:isoprene latex (28.72), the process being carried out as shown in Example 1.

| Stock | K | L |
|---|---|---|
| Marvinol VR-10 | 90 | 85 |
| Diethyl fumarate:isoprene copolymer latex | ª10 | ª15 |
| Izod Impact strength | 3.4 | 4.1 |
| Flexural modulus at 25° C | 334 | 250 |

ªSolid content.

This example shows that isoprene copolymers can be used instead of butadiene copolymers in my invention.

The blends of the invention may be substituted to great advantage for the usual rubber or plastic compositions, or even for metals or other materials, in many applications where toughness is a requirement. Thus, the present mixtures may be used to fabricate parts for machines, such as gears and cams; parts for textile machinery such as bobbins, shuttles, pickers, etc.; containers and pipes, especially for chemical and the like operations where resistance to corrosive substances is desired, as in filter press plates and tumbling barrel for plating operations; electrical parts, such as terminal blocks, telephones, and protective casings for cable joints; as well as tote boxes and trays; luggage; radio cabinets; furniture; phonograph records; paneling or covering for interior and exterior walls and surfaces of buildings, railroad cars or ships; automobile parts such as steering wheels, door panels, and seat parts; roller skate wheels; protective equipment such as helmets, and armor, including body armor; printing plates; tools; die cutting blocks; washing machine parts such as bearings and impellers; and numerous other articles, as will be evident to those skilled in the art. The blends may be laminated or otherwise reinforced, as with fibers or fabrics, if desired in making the foregoing or other articles, although usually the strength of the blends will be adequate without reinforcement.

Having thus described my invention, what I claim and desire to protect by Letters Patent is:

1. A rigid thermoplastic composition characterized by high impact strength, comprising an unplasticized, intimate fusion-blended mixture of (A) from 3 to 24 parts of a rubbery copolymer of from 15 to 85% of a conjugated diolefin with from 85 to 15% of a dialkyl fumarate, and (B) from 97 to 76 parts of a vinyl chloride polymer.

2. A rigid thermoplastic composition characterized by high impact strength, comprising an unplasticized intimate fused blend of (A) from 5 to 20 parts of a rubbery copolymer of from 15 to 85% of a conjugated diolefin with from 85 to 15% of a dialkyl fumarate, and (B) from 95 to 80 parts of a vinyl chloride polymer.

3. A rigid thermoplastic composition characterized by high impact strength, comprising an unplasticized intimate fused blend of (A) from 3 to 24 parts of a rubbery copolymer of from 15 to 85% of a conjugated diolefin with from 85 to 15% of a dialkyl fumarate, and (B) from 97 to 76 parts of polyvinyl chloride.

4. A rigid thermoplastic composition characterized by high impact strength, comprising an unplasticized intimate fused blend of (A) from 5 to 20 parts of a rubbery copolymer of from 15 to 85% of a conjugated diolefin with from 85 to 15% of a dialkyl fumarate, and (B) from 95 to 80 parts of polyvinyl chloride.

5. A rigid thermoplastic composition characterized by high impact strength, comprising an unplasticized intimate fused blend of (A) from 3 to 24 parts of a rubbery copolymer of from 15 to 85% of butadiene with from 85 to 15% of a dialkyl fumarate, and (B) from 97 to 76 parts of polyvinyl chloride.

6. A rigid thermoplastic composition characterized by high impact strength, comprising an unplasticized intimate fused blend of (A) from 5 to 20 parts of a rubbery copolymer of from 15 to 85% of butadiene with from 85 to 15% of diethyl fumarate, and (B) from 95 to 80 parts of polyvinyl chloride.

7. A rigid thermoplastic composition characterized by high impact strength, comprising an unplasticized intimate fused blend of (A) from 5 to 20 parts of a rubbery copolymer of from 15 to 85% of isoprene with from 85 to 15% of diethyl fumarate, and (B) from 95 to 80 parts of polyvinyl chloride.

References Cited in the file of this patent

UNITED STATES PATENTS

| 2,538,779 | Harrison et al. | Jan. 23, 1951 |
| 2,614,089 | Harrison et al. | Oct. 14, 1952 |
| 2,614,093 | Wheelock | Oct. 14, 1952 |

FOREIGN PATENTS

| 947,162 | France | Jan. 3, 1949 |